United States Patent
McGarry et al.

(10) Patent No.: US 7,285,926 B2
(45) Date of Patent: Oct. 23, 2007

(54) SYSTEM AND METHOD FOR LOCOMOTIVE ADHESION CONTROL

(75) Inventors: Jeremy Thomas McGarry, Erie, PA (US); Somakumar Ramachandra-Panicker, Bangalore (IN); Ajith Kuttannair Kumar, Erie, PA (US); Venkatarao Ryali, Bangalore (IN); Bret Dwayne Worden, Union City, PA (US); Jeffrey Louis Daigle, Erie, PA (US); Paul Kenneth Houpt, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/173,299

(22) Filed: Jun. 30, 2005

(65) Prior Publication Data

US 2007/0001629 A1 Jan. 4, 2007

(51) Int. Cl.
*B61C 15/08* (2006.01)
(52) U.S. Cl. .......................... 318/52; 318/362; 318/63; 318/821; 318/371
(58) Field of Classification Search .................. 318/52, 318/362, 63, 87, 84, 823, 362, 376, 371, 318/380, 434, 432, 430; 188/112 R; 73/117; 180/7 R
See application file for complete search history.

(56) References Cited

U.S. PATENT DOCUMENTS

| | | | | |
|---|---|---|---|---|
| 4,102,423 A * | 7/1978 | Reid | ........................... | 180/7.1 |
| 5,419,624 A * | 5/1995 | Adler et al. | ................. | 303/112 |
| 5,447,060 A * | 9/1995 | Smith et al. | ................... | 73/117 |
| 5,452,605 A * | 9/1995 | Wilson et al. | ................ | 73/117 |
| 5,661,378 A * | 8/1997 | Hapeman | ...................... | 318/52 |
| 5,841,254 A | 11/1998 | Balch et al. | ................. | 318/430 |
| 6,163,121 A | 12/2000 | Kumar et al. | ................ | 318/434 |
| 6,208,097 B1 | 3/2001 | Reddy et al. | .................. | 318/52 |
| 6,364,812 B1 * | 4/2002 | Robichaux et al. | ......... | 477/160 |
| 6,371,884 B1 * | 4/2002 | Channing | ................... | 477/107 |
| 6,758,087 B2 | 7/2004 | Balch et al. | ................ | 73/118.1 |
| 2004/0075280 A1* | 4/2004 | Kumar et al. | .................. | 291/2 |

* cited by examiner

*Primary Examiner*—Karen Masih
(74) *Attorney, Agent, or Firm*—Fletcher Yoder

(57) ABSTRACT

A traction control system for controlling an electric traction motor drivingly coupled to a wheel of a tractive vehicle. The traction control system includes means for determining speed of the wheel, means for determining tractive effort of the wheel and a control circuitry for controlling drive signals to the motor based upon the wheel speed and tractive effort.

30 Claims, 9 Drawing Sheets

SYSTEM AND METHOD FOR LOCOMOTIVE ADHESION CONTROL

BACKGROUND

The present invention relates generally to the field of locomotives and their control. More particularly, the invention relates to techniques for maximizing the tractive effort or braking effort of a locomotive and minimizing the resonant torsional vibration per axle to improve overall performance.

Locomotives and transit vehicles as well as other large traction vehicles are commonly powered by electric traction motors coupled in driving relationship to one or more axles of the vehicle. Such locomotives and transit vehicles typically have at least four axle-wheel sets per vehicle with each axle-wheel set being contacted via suitable gearing to the shaft of a separate electric motor commonly referred to as a traction motor. In a motoring mode of operation, the traction motors are supplied with electric current from a controllable source of electric power such as an engine-driven traction alternator. The traction motors apply torque to the vehicle wheels, which in turn exert tangential force or tractive effort on the surface such as the parallel steel rails of a railroad track on which the vehicle is traveling, and thereby propel the vehicle in a desired direction along the right of way. In another instance, in an electrical braking mode of operation, the motors serve as axle-driven electrical generators. Torque applied to the shafts of the axle-wheel sets in such an instance by their respective associated axle-wheel sets then exert braking effort on the surface, thereby retarding or slowing the vehicle's motion. In either case, good adhesion between each wheel and the surface is required for efficient operation of the vehicle.

Maximum tractive effort or braking effort is obtained if each powered wheel of the vehicle is rotating at such an angular velocity that its actual peripheral speed is slightly higher (in case of motoring) or slightly lower (in case of braking) than the actual speed of the vehicle. The linear speed at which the vehicle is traveling is usually referred to in literature as ground speed or track speed and the difference between wheel speed and ground speed is referred to as slip speed or creep. There is usually a relatively low limit on the value of slip speed at which peak tractive effort or braking effort is realized. This value, commonly known as optimum creep is a variable that depends on ground speed and rail conditions. Operation of any or all wheels away from the optimum creep, for instance, at too small a creep value or too large a creep value, may result in a reduction or loss of wheel-to-rail adhesion. Likewise, if the wheel-to-rail adhesion tends to be reduced or lost, some or all the vehicle wheels may slip excessively, i.e., the actual slip speed or creep may be greater than the optimum creep. Such a wheel slip condition, which is characterized in the motoring mode by one or more slipping axle-wheel sets and in the braking mode by one or more sliding or skidding axle-wheel sets, can cause accelerated wheel wear, rail damage, high mechanical stresses in the drive components of the propulsion system, and an undesirable decrease of tractive (or braking) effort. Accordingly, it is desirable to control the allowable creep of all the wheels to maximize the total traction performance. There are many difficulties associated with determining an optimal creep set point for peak adhesion. Creep optimization requires measurement/estimation of wheel tractive effort and wheel creep. Direct measurement of the wheel tractive effort using strain gages for instance, is expensive, requiring significant changes to the wheels. Moreover, the sensors used for direct measurement of wheel tractive effort are also prone to noise. Some of the prior art involve estimation of the wheel tractive effort based on motor torque measurement by a simplistic method using the gear transmission ratio and the wheel radius; see, e.g., U.S. Pat. No. 6,208,097 issued on Mar. 27, 2001 to General Electric Company (hereby incorporated into the present disclosure by reference). Such a method is also error prone owing to approximation of the dynamics of the drive train and related process noise. This method especially loses it validity when the drive train resonates at its natural mode of vibration. One such exemplary situation occurs when inter-axle dynamics owing to mechanical coupling between the platform, all the trucks and all the axle-wheel sets, become pronounced. This will be the case when, for instance, the pitching and rolling modes of the trucks and platform of the locomotive resonate resulting in significant weight-shift effects and associated wheel normal force variations. The resonance may typically manifest in significant oscillations in the motor torque adversely affecting the accuracy of torque maximization methods disclosed in prior art.

Wheel creep requires measurement/estimation of wheel speed and ground speed. Adhesion control systems and methods found in prior art describe determination of wheel speed from the speed of the motor shaft in a well-known manner using the gear transmission ratio. The relationship between the motor speed and wheel speed is typically assumed to be algebraic and the ratio of the motor speed to the average wheel speed of the axle is taken to be equal to the gear ratio. This method of determination of wheel speed is simplistic and is prone to errors owing to errors in motor speed measurement and also owing to approximation of the dynamics of the drive train while estimating wheel speed. The latter especially is the case when the drive train resonates at its natural mode of vibration resulting in a difference in speeds of the two wheels of the axle-wheel set.

Another factor affecting traction performance is the level of torsional resonant vibration in the mechanical drive train, which comprises the axle and its associated two wheels, the motor to the axle gearbox, the traction motor and the traction motor drive. In particular, during operation in certain regions of the adhesion characteristic curve, the mechanical drive train might experience a net negative damping, which produces severe vibration levels at natural frequencies or vibration modes of the system. As is well known, an adhesion characteristic curve graphically represents the coefficient of adhesion versus percentage creep. At zero percent creep, maximum damping on the mechanical system is represented. As the percent creep level increases in motoring (or decreases in braking) in the portion of the characteristic curve to the left of its peak in motoring (or right of its peak in braking), the damping effect on the mechanical system decreases to a value of zero at the peak. For increasing percent creep values to the right of the peak in motoring (or left of the peak in braking), the damping provided to the mechanical system becomes a large negative number.

The natural frequencies or vibration modes of a system are a function of the drive train component materials and geometries that vary slightly over the life of a vehicle due to wear and tear. Dependent on the magnitude and duration of the vibration periods, the drive train may be damaged. Accordingly, it is desirable to minimize torsional resonant vibration in order to maximize traction performance. Prior art involves frequency response analysis of estimated torque feedback of each traction motor. Since such a method is based only on one signal, there is scope for improvement in accuracy and reliability by considering many more representative signals.

These issues in the measurement/estimation of wheel speed values and wheel tractive effort values result in an adhesion optimization system that usually operates suboptimally. Accordingly, it is desirable to obtain the best possible estimates/measurements of wheel speeds, wheel tractive efforts and extent of torsional vibration, accounting for the influence of various dynamics of the drive train and also the influence of inter-axle dynamics pertaining to various suspensions and the mechanical coupling between the locomotive platform, all the trucks and all the axle-wheel sets.

BRIEF DESCRIPTION

Briefly, in accordance with one embodiment of the invention, there is provided a traction control system for controlling an electric traction motor drivingly coupled to a wheel of a tractive vehicle. The traction control system includes means for determining speed of the wheel, means for determining tractive effort of the wheel and a control circuitry for controlling drive signals to the motor based upon the wheel speed and tractive effort.

In accordance with another embodiment of the invention, there is provided a method for controlling a traction motor of a propulsion system of a tractive vehicle. The method includes determining speed of the wheel, determining tractive effort of the wheel and applying drive signals to the motor based upon the wheel speed and tractive effort.

DRAWINGS

The foregoing and other advantages and features of the invention will become apparent upon reading the following detailed description and upon reference to the drawings in which.

DETAILED DESCRIPTION

Through the present discussion, it should be noted that the present invention may be utilized with various types of alternating current (AC) induction motor and DC motor powered vehicles such as off-highway vehicles (earth-moving machines), transit cars, and railroad locomotives. By way of example and not limitation, the invention is described herein as it may be applied to a locomotive.

Figure 1:
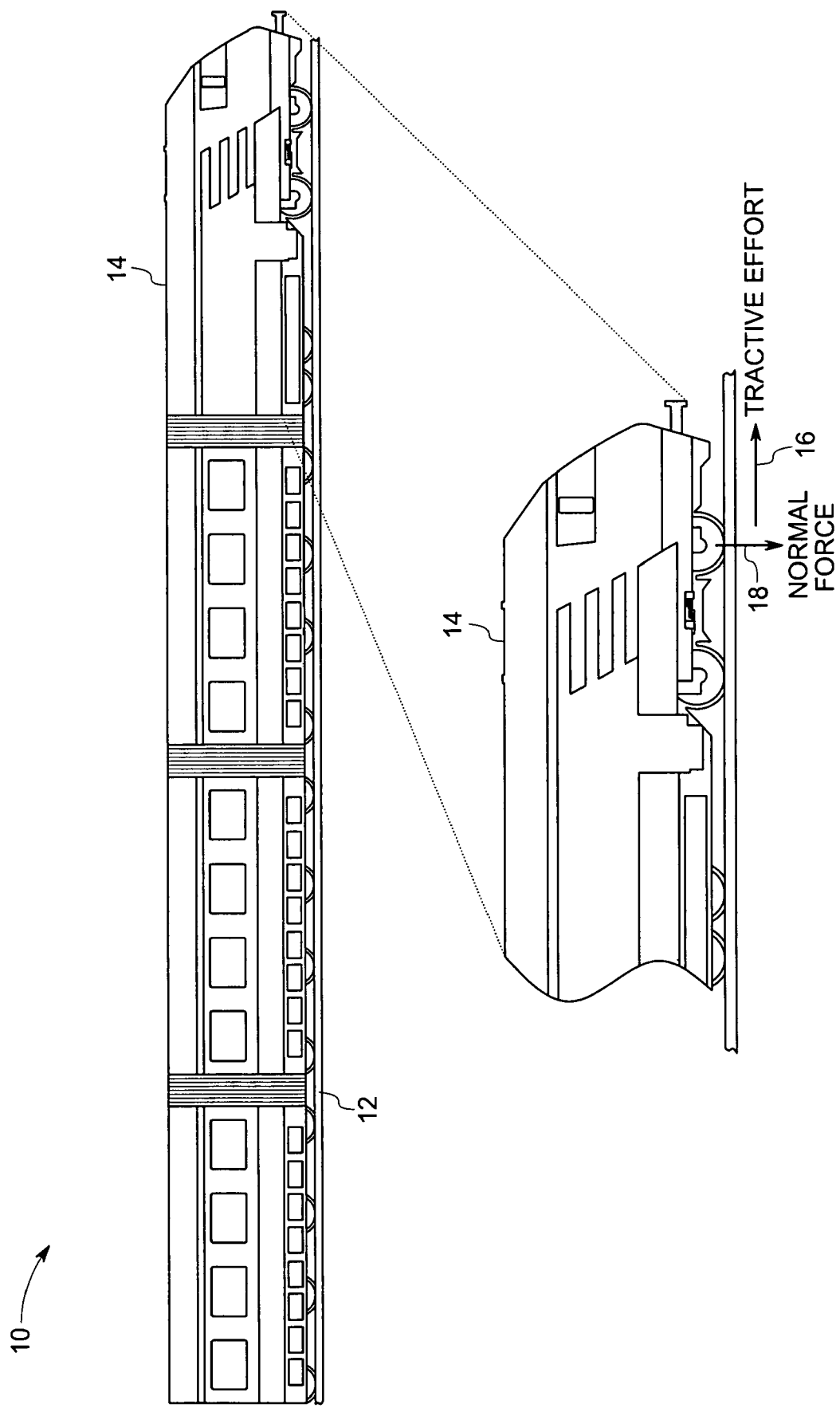
FIG. 1 is diagrammatical view of a train including a locomotive, and illustrating the tractive effort and adhesion of the locomotive controlled in accordance with an exemplary embodiment of this invention.

FIG. 1 is diagrammatical view of a train including a locomotive, and illustrating the tractive effort and adhesion of the locomotive controlled in accordance with an exemplary embodiment of this invention. The train 10 runs on rails 12. A locomotive 14 drives the train by means of electric traction motors at each axle-wheel set, as described in greater detail below. In the motoring mode of operation, these traction motors exert torque to the vehicle wheels, which exert tangential force or tractive effort on the surface such as the parallel steel rails of a railroad track on which the vehicle is traveling, and thereby propel the vehicle in a desired direction along the right of way. The tractive effort 16 developed at each wheel of the locomotive is proportional to the normal force 18 acting on the wheel. The proportionality constant is the coefficient of adhesion and the resulting relation is expressed as:

Wheel tractive effort=Coefficient of adhesion*Wheel normal force

The total tractive effort developed by the locomotive is the sum of all the wheel tractive efforts.

Alternatively, in an electrical braking mode of operation, the traction motors server as axle-driven generators. Torque is applied to their shafts by their respectively associated axle-wheel sets which then exert braking effort on the surface, thereby retarding or slowing the vehicle's progress. The braking effort is applied in a direction opposite to that of the tractive effort.

Figure 2:
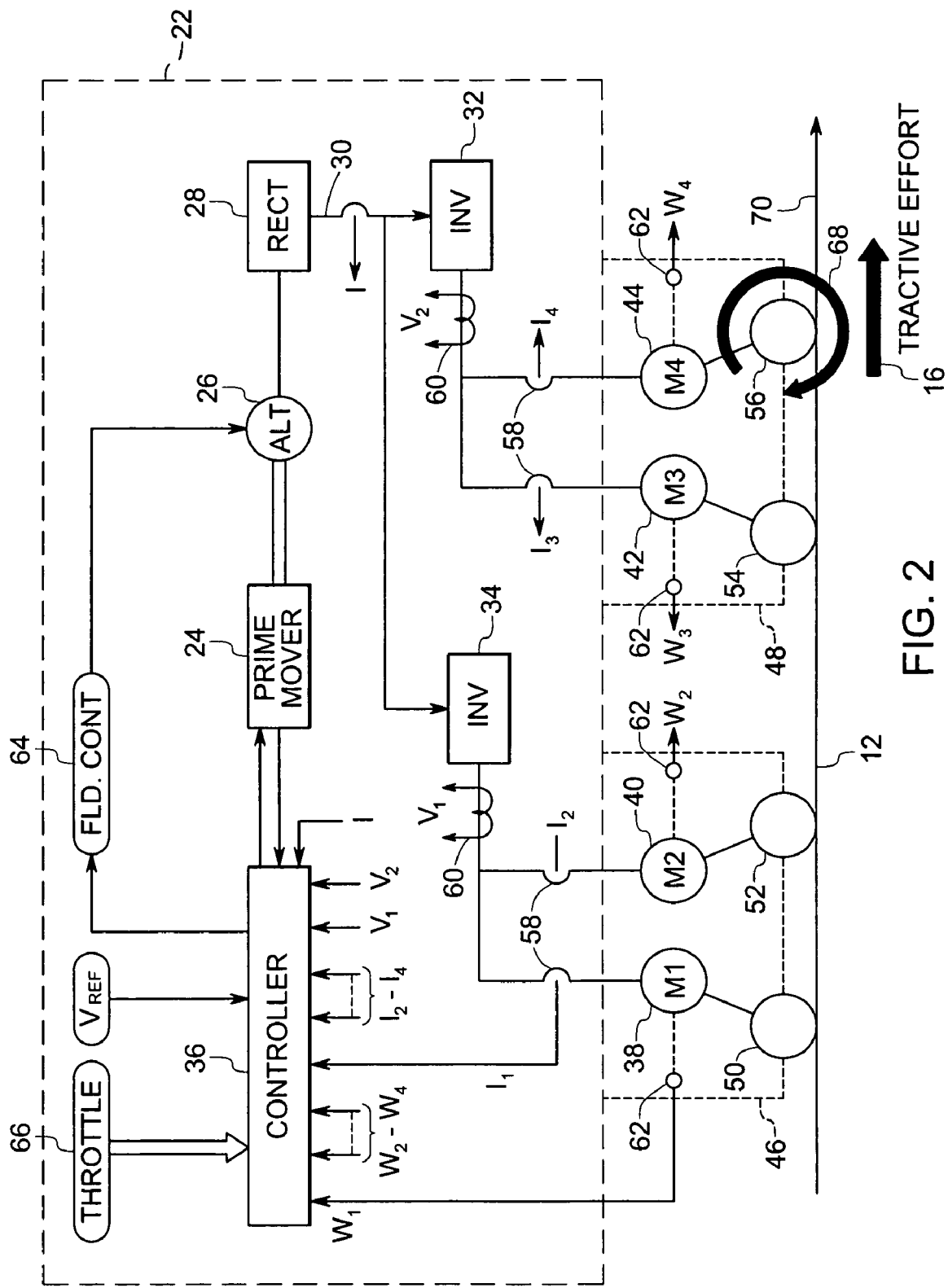
FIG. 2 is a diagrammatical representation of exemplary principal components of a propulsion system for a diesel-electric locomotive in accordance with aspects of the present techniques.

FIG. 2 presents a simplified block diagram of an exemplary locomotive system with which the invention may be used. A propulsion system 22 of FIG. 2 includes a variable speed prime mover or engine 24 mechanically coupled to a rotor of a dynamo electric machine 26 comprising, in this case, a 3-phase alternating current (AC) synchronous generator or alternator. The 3-phase voltages developed by alternator 26 are applied to AC input terminals of a conventional power rectifier bridge 28. The direct current (DC) output of bridge 28 is coupled via a DC link 30 to a number of controlled inverters 32 and 34, which invert the DC power to AC power at a selectable variable frequency. The inverters 32 and 34 are conventional inverters employing high power gate turn-off devices which switch in and out of conduction in response to gating signals from a system controller 36 so as to invert the DC voltage on DC link 30 to controlled frequency AC voltage. In the illustrated embodiment, the AC power is electrically coupled in energizing relationship to each of a plurality of adjustable speed AC traction motors 38, 40, 42 and 44. Prime mover 24, alternator 26, rectifier bridge 28 and inverters 32 and 34 are mounted on a platform of the traction vehicle 14, illustrated as a diesel-electric locomotive. The platform is, in turn, supported on two trucks 46 and 48, the first truck 46 having two axle-wheel sets 50 and 52 and the second truck 48 having two axle-wheel sets 54 and 56.

Each of the traction motors 38, 40, 42 and 44 is hung on a separate axle and its rotor is mechanically coupled, via conventional gearing, in driving relationship to the respective associated axle-wheel set. In the embodiment shown, the two motors 38 and 40 of axle wheel sets 50 and 52, respectively, are electrically coupled in parallel with one another and receive power from inverter 34 while motors 42 and 44 are similarly coupled to inverter 32. However, in some instances, it may be desirable to provide an inverter for each motor or to couple additional motors to a single inverter. The invention is not limited to such 4-axle systems and is equally applicable, for example, to 6-axle locomotives with six inverters each connected for powering a respective one of six traction motors each connected to respective ones of the six axles.

Suitable current transducers 58 and voltage transducers 60 are used to provide current and voltage feedback signals which are respectively representative of the magnitudes of current and voltage applied to motors 38, 40, 42 and 44. Speed sensors 62 are used to provide speed signals representative of the rotational speeds W1-W4 in revolutions per minute (RPM) or proportional units of the motor shafts. These speed signals are converted to wheel speeds in accordance with an embodiment of this invention. For simplicity, only single lines have been indicated for power flow, although it will be apparent that motors 38, 40, 42 and 44 are typically three phase motors so that each power line represents three lines in such applications.

The magnitude of output voltage and current supplied to rectifier bridge 28 is determined by the magnitude of excitation current supplied to the field windings of alternator 26 by a field controller 64 which may be a conventional phase controlled rectifier circuit, for alternator fields generally requiring DC excitation. The excitation current is set in response to an operator demand in a (throttle 66) for vehicle speed by controller 36, which is in turn responsive to actual speed as represented by signals W1-W4. Controller 36 converts the throttle command to a corresponding torque request for use in controlling motors 38, 40, 42 and 44. Since AC motor torque is proportional to rotor current and air gap flux, these quantities may be monitored. More commonly, other quantities, such as applied voltage, stator current and motor RPM, may be used to reconstruct motor torque in controller 36. In an electrical braking or retarding mode of operation, inertia of the moving vehicle is converted into electrical energy by utilizing the traction motors as generators and motor voltage and current are controlled to set a desired braking effort.

Figure 3:
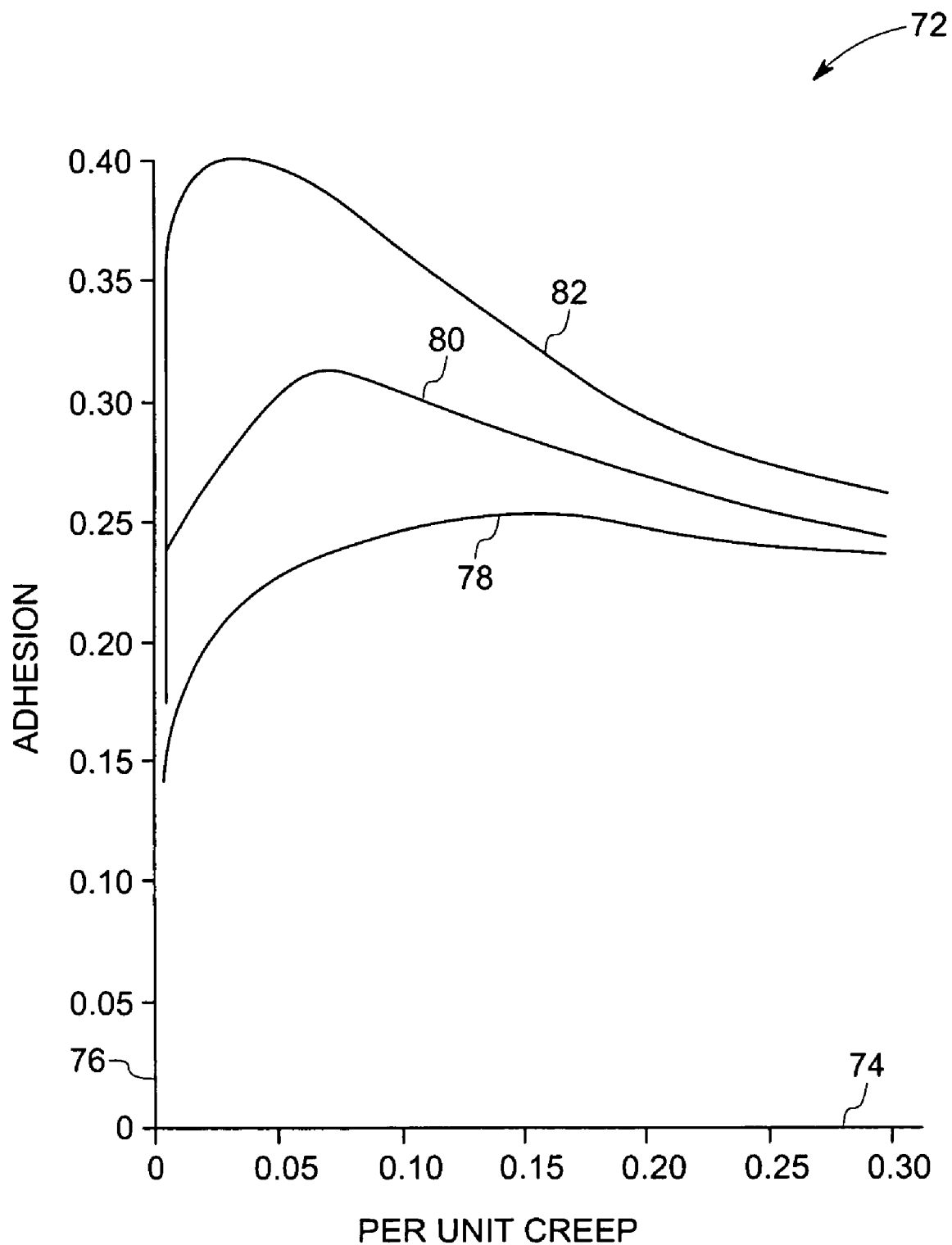
FIG. 3 is a graphical representation of an exemplary functional relationship between adhesion and creep for different weather conditions, illustrating optimal creep levels for adhesion used as a basis for explaining the algorithms implemented by the present techniques.

Before turning to a description of the detailed implementation of the present invention, reference is first made to the concepts of adhesion and wheel creep as illustrated in a series of curves in FIG. 3. Each curve illustrates an example of wheel-to-rail slipping or sliding in the motoring mode for three different weather conditions common to locomotive applications. Referring to FIG. 3, a graphical representation is provided of an exemplary relationship between adhesion and creep for different weather conditions, illustrating optimal creep levels for adhesion used as a basis for explaining the algorithms implemented by the present techniques. The horizontal or the X-axis 74 of the adhesion-creep curves represents per unit creep values expressed as fractions and the vertical or the Y-axis 76 represents adhesion (friction coefficient) values also expressed as fractions. The three different weather conditions that were chosen for illustrative purposes are represented by "wet" curve 78, "dry" curve 80 and "dry with sand" curve 82. It will be noted that the highest adhesion is available with a rail, which is both dry and sanded. As shown by the illustrated curve, the adhesion reaches a peak on the "dry and sanded" adhesion-creep curve at about a 0.05 per unit creep level and then gradually reduces as creep speed increases. Referring to the "dry" adhesion-creep curve, maximum adhesion is obtained at some value of per unit creep less than 0.1, while the "wet" adhesion-creep curve indicates that maximum adhesion is not realized until per unit creep obtains typically a value somewhere between 0.15 and 0.25. As is known to those skilled in the art, wheel creep is the relative motion between the wheel surface and the rails. As shown in FIG. 3, the best conditions for obtaining the greatest pulling force or tractive effort does not occur at zero creep, although the optimum creep level changes with conditions and can be expressed to change during the course of transport over any distance.

In general, it is desirable to maintain per unit creep or creep speed at the point at which maximum adhesion occurs. It is thus possible to select the appropriate adhesion-creep curve based on observed weather conditions, and determine from this curve an ideal creep that must be achieved and maintained in order to achieve and maintain a maximum adhesion value. In addition, there are maximum and minimum allowable creep levels that are typically a function of vehicle speed, wheel tractive efforts, wheel speeds and the extent of axle torsional vibration. Additional constraints are also applied to decide the allowable creep. These factors and creep limits combine to allow sufficient non-zero creep levels for starting the locomotive from zero speed and to provide a fixed allowable creep level when the axle is rotating at the reference speed mode.

In an electrical braking or retarding mode of operation, inertia of a moving vehicle is converted into electrical energy by utilizing the traction motors as generators and motor voltage and current are controlled to set a desired braking effort.

Figure 4:
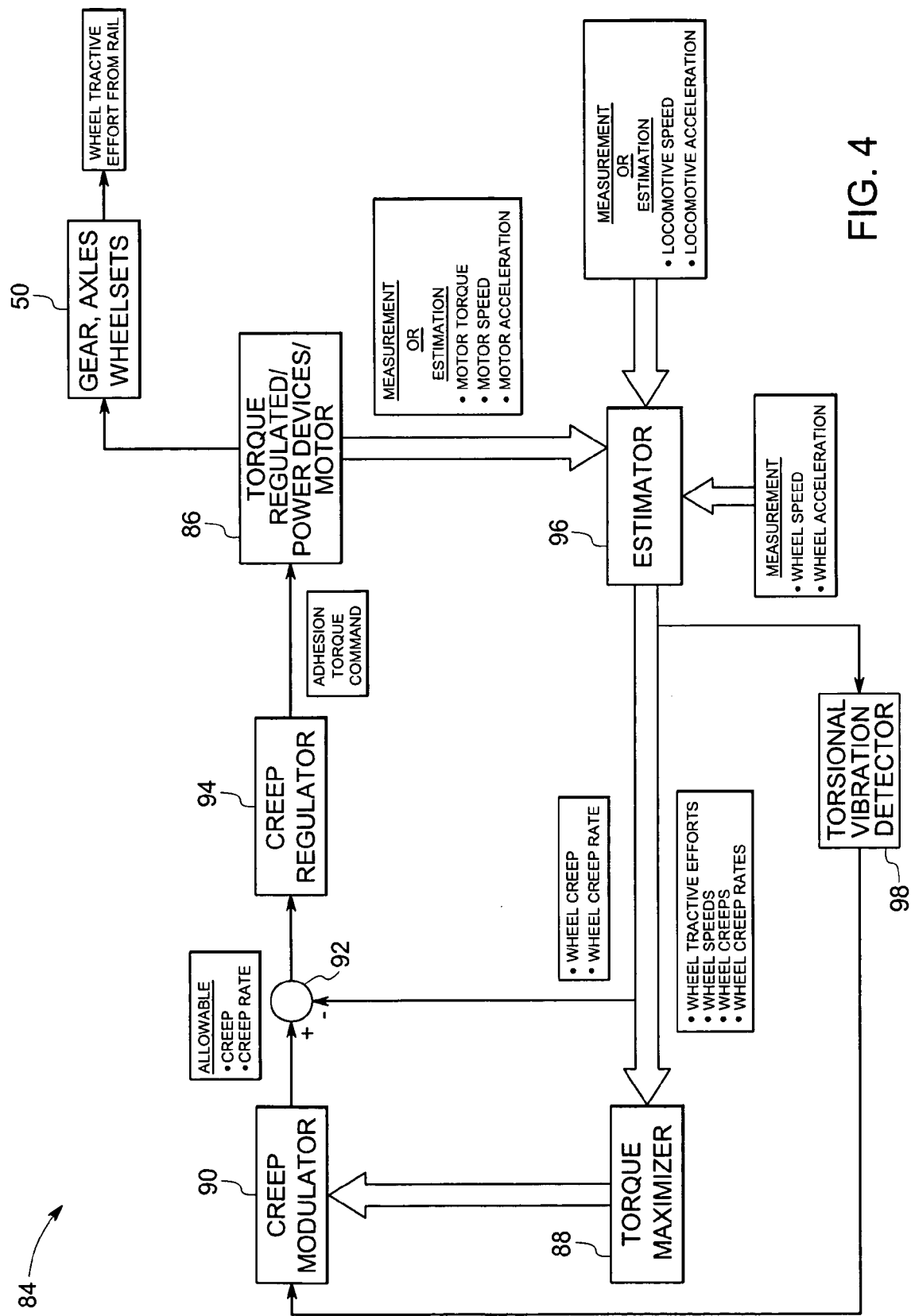
FIG. 4 is a diagrammatical representation of an adhesion control system in accordance with an exemplary embodiment of the present techniques which involves separate creep control of individual axles.

Throughout the following explanation, the terms "traction control system", "adhesion control system" and "creep control system" are used interchangeably to refer to the adhesion control system circuitry as shown in FIG. 4.

FIG. 4 is a functional block diagram illustrating one embodiment of an adhesion control system 84 residing in the respective controllers of inverters 32 or 34 for each axle shown in FIG. 2. This embodiment of the invention relates to separate creep control system and method for each individual axle. The adhesion control system 84 comprises a torque maximizer 88, a creep modulator 90, a creep regulator 94, an estimator 96 and a torsional vibration detector 98.

Tractive effort optimization in a typical adhesion control system involves determination of an optimum allowable creep for the appropriate adhesion-creep curve and a feedback control system to track and maintain this optimum allowable creep within a range of minimum error. This function is realized by an adhesion control system 84 of FIG. 4. This adhesion control system acts to ensure that the locomotive operates within a certain acceptable range around the peak of an appropriate adhesion-creep curve.

The torque maximizer 88 measures traction system performance levels and determines the desired torque maximizer state or operating mode for maximizing traction performance of each individual axle. The torque maximizer 88 uses the best possible estimates/measurements of actual speeds and tractive efforts of both the wheels of any axle-wheel set obtained from the estimator 96 to estimate the traction performance level of the axle-wheel set and determine an appropriate torque maximizer state.

Figure 6:
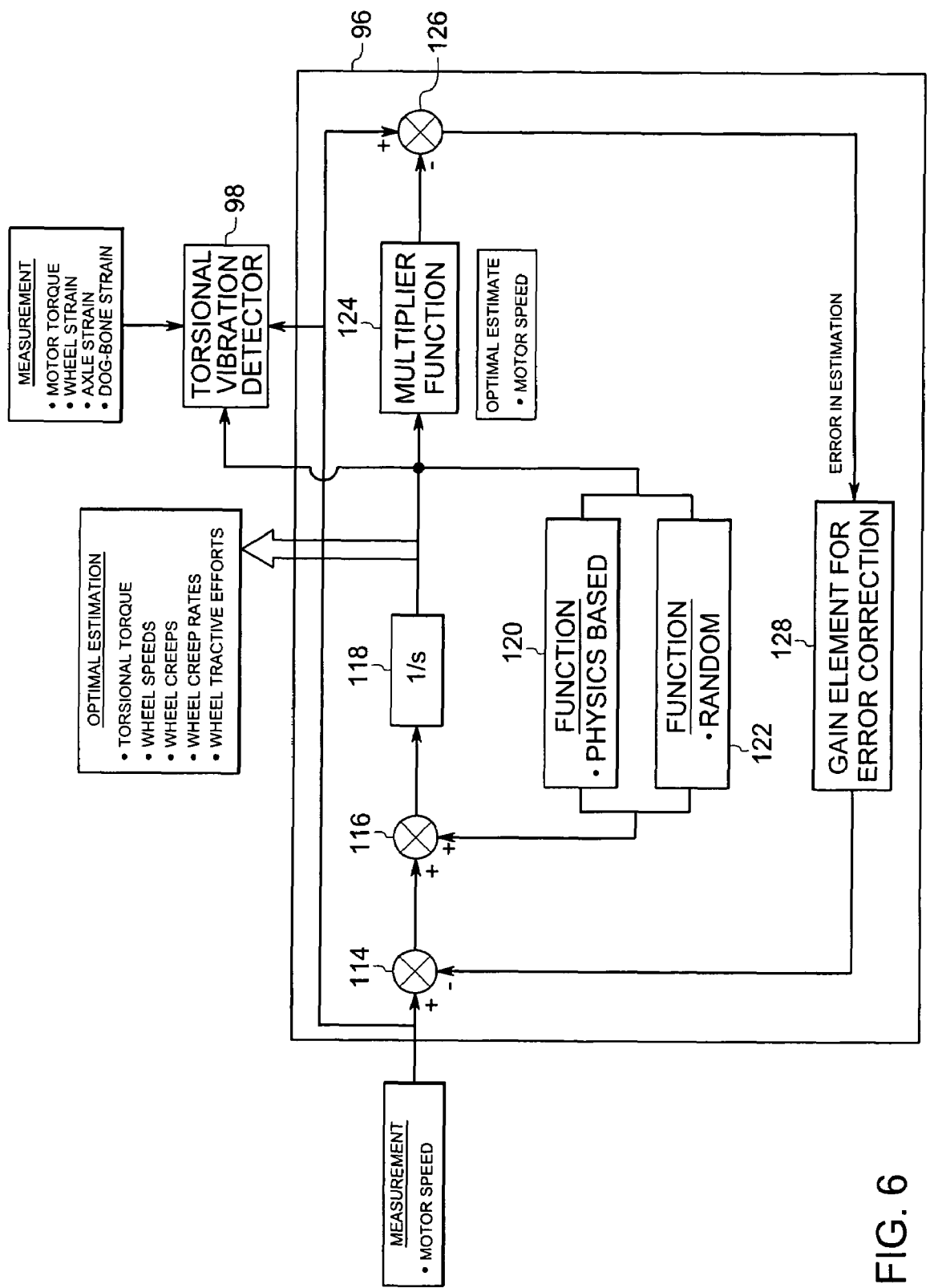
FIG. 6 is a diagrammatical representation of an estimator used to estimate the wheel speed and wheel tractive effort of a single axle-wheel set of the adhesion control system of FIG. 4.

Referring to FIG. 4, the estimator 96 estimates the wheel speeds, wheel tractive efforts and wheel creep values in the adhesion control system 84 of FIG. 4. In one embodiment of the invention, if direct measurements of the wheel speeds and wheel tractive efforts are available, the estimator 96 can minimize the noise effects in these measurements. Moreover, wheel creep values may be typically estimated by subtracting the locomotive/ground speed estimate/measurement from the wheel speed estimates/measurements. Several methods can be used to estimate the locomotive speed such as, for example, GPS-based methods or those disclosed in the prior art; see, for example U.S. Pat. No. 6,758,087 issued on Jul. 6, 2004 to General Electric Company (hereby incorporated into the present disclosure by reference). In another embodiment of the invention, the estimator 96 additionally provides an estimate of the axle torsional torque. A functional block diagram of the estimator 96 is illustrated in FIG. 6 with a more detailed description as given below.

Referring to FIG. 4, the torsional vibration detector 98 digitally processes the wheel speed estimates/measurements, the difference in the wheel speed estimates/measurements of each axle, wheel tractive effort estimates/measurements and axle torsional torque estimate obtained from the estimator 96, in addition to the motor torque feedback, motor speed, wheel strain, axle strain and dog-bone strain in order to detect an unacceptable level of torsional vibration in each axle. A functional block diagram of 98 is illustrated in more detail below.

The output of the torque maximizer 88 along with a signal representative of the level of axle torsional vibration mode obtained from the torsional vibration detector 98 is provided to the creep modulator 90. The creep modulator 90 processes these inputs to control the operating creep level of the locomotive gear and axle set described above in relation to FIG. 2. The function of the creep modulator 90 is to modulate the allowable creep level for each axle between a maximum allowable creep level and a minimum allowable creep level. These maximum and minimum allowable creep levels are typically functions of vehicle speed, wheel tractive efforts, wheel speeds and the extent of axle torsional vibration. Additional constraints are also applied to decide the allowable creep. These factors and creep limits combine to allow sufficient non-zero creep levels for starting the locomotive from zero speed and to provide a fixed allowable creep level when the axle is functioning at the reference speed mode. An exemplary creep modulator is disclosed in U.S. Pat. No. 6,163,121 issued on Dec. 19, 2000 to General Electric Company (hereby incorporated into the present disclosure by reference).

The actual realized creep for each axle-wheel set is compared with the associated creep set point from creep modulator 90 at the comparator 92. The error determined by the comparison is input to the creep regulator 94 whose objective is to keep this error as small as possible under all operating conditions through feedback control. As described below, the present invention ultimately provides for control of the motors driving each axle-wheel set. The creep regulator 94 is typically a proportional-plus-integral controller or a higher order controller designed to ensure stability of the creep regulation loop for every axle-wheel set, even when operating in the negative slope region of an adhesion characteristic curve. The output from the creep regulator 94 is typically a torque command that is fed to a torque regulator system 86 associated with the axle and which typically includes the associated torque regulation circuit, the power devices and the electric motor illustrated in FIG. 2. These motors drive the associated axle-wheel set through appropriate gearing as shown in 50.

Figure 5:
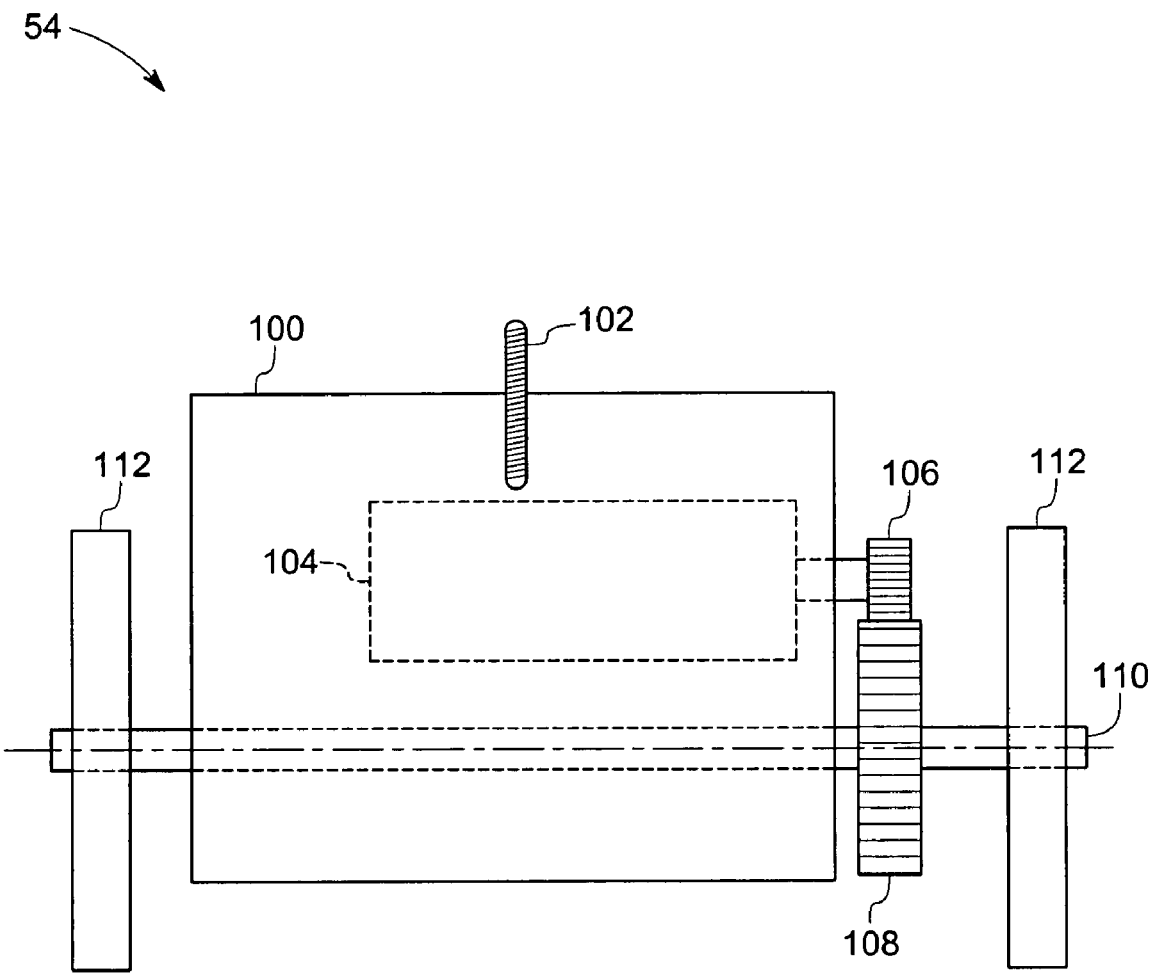
FIG. 5 is a diagrammatical representation of a single axle-wheel set of the locomotive of FIG. 1 with associated traction motor and suspension system.

FIG. 5 is a diagrammatical representation of a single axle-wheel set of the locomotive of FIG. 1 with associated traction motor and suspension system. A traction motor is hung on the axle 110 with its frame 100 suspended from the associated truck by the dog-bone suspension 102. The rotor 104 of the motor is mechanically coupled, via conventional gearing involving a pinion 106 and bull gear 108 pair, in driving relationship to the associated axle 110. The distribution of inertia between the two wheels 112, one close to the bull gear and the other away from the bull gear, is non-uniform. This factor and the fact that the two wheels 112 can experience different rail conditions may lead to an operational situation in which these two wheels creep at different values and possibly excite the axle torsional vibration mode.

FIG. 6 is a block diagram of an estimator that accounts for the dynamics of the drive train while estimating wheel speed values and wheel tractive effort values of the single axle-wheel set. In particular, FIG. 6 is a diagrammatical representation of an estimator 96 of FIG. 4 that is used to estimate the wheel speeds and wheel tractive efforts of a single axle-wheel set of the adhesion control system. The wheel speed is a function of the motor speed. Motor speed values may therefore be converted into wheel rotational speed values based upon the known gear ratio of the mechanical coupling between the motor shaft and wheel axle. In one embodiment of the invention based on independent axle control, this estimate of the wheel speed is improved upon using a combination of physics-based and random models describing the dynamics of the wheel speeds and wheel tractive efforts of the single axle-wheel set system shown in FIG. 5. In this embodiment, the mathematical models describing these dynamics are as follows:

$$\frac{d\omega_1}{dt} = \frac{GT_m}{J_1} - \frac{rT_{E1}}{J_1} - \frac{T_s}{J_1} \quad (1)$$

$$\frac{d\omega_2}{dt} = \frac{T_s}{J_2} - \frac{rT_{E2}}{J_2} \quad (2)$$

$$\frac{dT_s}{dt} = k(\omega_1 - \omega_2) + c(\dot{\omega}_1 - \dot{\omega}_2) \quad (3)$$

$$\frac{d^k T_{E_1}}{dt^k} = n_{1k}(t), \quad 1 \leq k \leq N_1 \quad (4)$$

$$\frac{d^p T_{E_2}}{dt^k} = n_{2p}(t), \quad 1 \leq p \leq N_2 \quad (5)$$

The first three equations are physics-based torque balance equations describing the two wheel speeds of the wheel set. The first equation describes the dynamics of the wheel close to the bull gear. In this equation, the motor torque Tm scaled by the gear ratio G defines the driving torque, which is balanced against the tractive effort TE1 corresponding to that particular wheel, and the torsional torque Ts. The second equation describes the dynamics of the wheel away from the bull gear. The driving torque for this wheel is equal in magnitude to the torsional torque and is balanced against the corresponding wheel tractive effort TE2. The torsional torque Ts arises due to torsional flexibility in the axle. Torsional flexibility in the axle results in an imbalance in the wheel speeds w1 and w2 and gives rise to the torsional torque Ts as a reaction to axle twist. The third equation describes the torsional torque in terms of the axle stiffness k and damping c. The wheel tractive efforts TE1 and TE2 are modeled as pseudo-random functions of time as shown in the fourth and fifth equations. Tractive effort TE1 is modeled as a pseudo-random variable that is N1 times differentiable as shown in the fourth equation. The variables n1$i$ are noise signals with typical noise characteristics. As will be appreciated by those skilled in the art, this is equivalent to modeling the tractive effort TE1 as an (N1−1)-th order polynomial in time with random coefficients as shown below:

$$T_{E_1} = \sum_{i=0}^{N_1-1} a_{1i} t^i \qquad (6)$$

The coefficients a1$i$ are allowed to evolve as pseudo-random parameters over time accounting for variation in the tractive effort over time. The coefficients a1$i$ are updated with each updating of the estimates. The update law is based on a typical random walk model that involves integration of the noise signals n1$i$ and a judicious choice of N1 (which may be determined empirically by those skilled in the art without undue experimentation). The tractive effort for the second wheel TE2 is modeled in a similar manner as shown in the fifth equation above, where the variables n2$i$ are the corresponding noise signals not necessarily identical to the respective n1$i$ variables. The order N2 of the TE2 model is not necessarily equal to N1.

Solution of the above equations over time typically gives an estimate of the wheel speeds and wheel tractive efforts in addition to the estimation of the torsional torque. The solution of equations (1)-(5) can be obtained by integration of the right-hand side of equations (1)-(5). This solution methodology is illustrated in FIG. 6 in terms of the feedback interconnection between the integrator 118 and function blocks 120 and 122. The right-hand sides of the physics-based equations (1)-(3) define the function block 120. The right-hand sides of the random function-based equations (4)-(5) together with (6) define the function block 122. The output of the integrator provides the solution of equations (1)-(5) which, when fed back through the function blocks 120 and 122 and summed up with the initial values of the solutions at the summer 116 define the right-hand side of equations (1)-(5).

The operation of the estimator 96 in FIG. 6 is based on an iterative predictor-corrector mechanism. The model equations (1)-(6) are used to predict the values of the wheel speeds, wheel tractive efforts and torsional torque. The wheel speeds are then used to back-calculate and obtain an estimate of the motor speed '$w_m$' from the gear ratio G and the speed w1 of the wheel close to the bull gear using the relationship:

$$\omega_m = \omega_1 * G \qquad (7).$$

This back-calculation is realized in the multiplier function block 124 of FIG. 6. This estimate of the motor speed is compared with the actual measurement value at the adder 126 and the resulting error in prediction computed. The resulting error in prediction is scaled by the gain element 128 and is fedback to the summer 116 via the adder 114 with opposite sign to correct the prediction. The corresponding mathematical equations are as shown below:

$$\frac{d\omega_1}{dt} = \frac{GT_m}{J_1} - \frac{rT_{E1}}{J_1} - \frac{T_s}{J_1} + K_1(\omega_1 - \omega_m/G) \qquad (8)$$

$$\frac{d\omega_2}{dt} = \frac{T_s}{J_2} - \frac{rT_{E2}}{J_2} + K_2(\omega_1 - \omega_m/G) \qquad (9)$$

$$\frac{dT_s}{dt} = k(\omega_1 - \omega_2) + c(\dot\omega_1 - \dot\omega_2) + K_3(\omega_1 - \omega_m/G) \qquad (10)$$

$$\frac{d^k T_{E_1}}{dt^k} = K_{4k}(\omega_1 - \omega_m/G), \quad 1 \leq k \leq N_1 \qquad (11)$$

$$\frac{d^p T_{E_2}}{dt^k} = +K_{5p}(\omega_1 - \omega_m/G), \quad 1 \leq p \leq N_2. \qquad (12)$$

An appropriate choice of the gain parameters K1, K2, K3, K4$k$ and K5$p$ (which may be determined analytically and empirically by those skilled in the art without undue experimentation) will result in an estimation of the wheel speeds, wheel tractive efforts and torsional torque with negligible error. The choice of the gain parameters depends on an accurate understanding of the level of measurement and process noise and model errors. A similar correction can be applied if estimates of the wheel tractive efforts are obtained through other means, for example, strain gages.

In one embodiment of the invention, the estimator 96 arrives at an estimate of the wheel tractive effort based on a direction of the tractive effort, that is, depending on whether the locomotive is motoring or braking. In another embodiment of the invention, the estimator 96 arrives at an estimate of the wheel tractive effort based on a position of the traction motor.

Tractive effort maximization systems and methods based on creep rate rather than creep that are extensions of systems and methods such as those disclosed in U.S. Pat. No. 6,208,097, discussed above, may be readily realized using the system and method illustrated in FIG. 4. It is to be noted that the left-hand side of equations (1)-(5) defines the rate of change variables.

Figure 7:
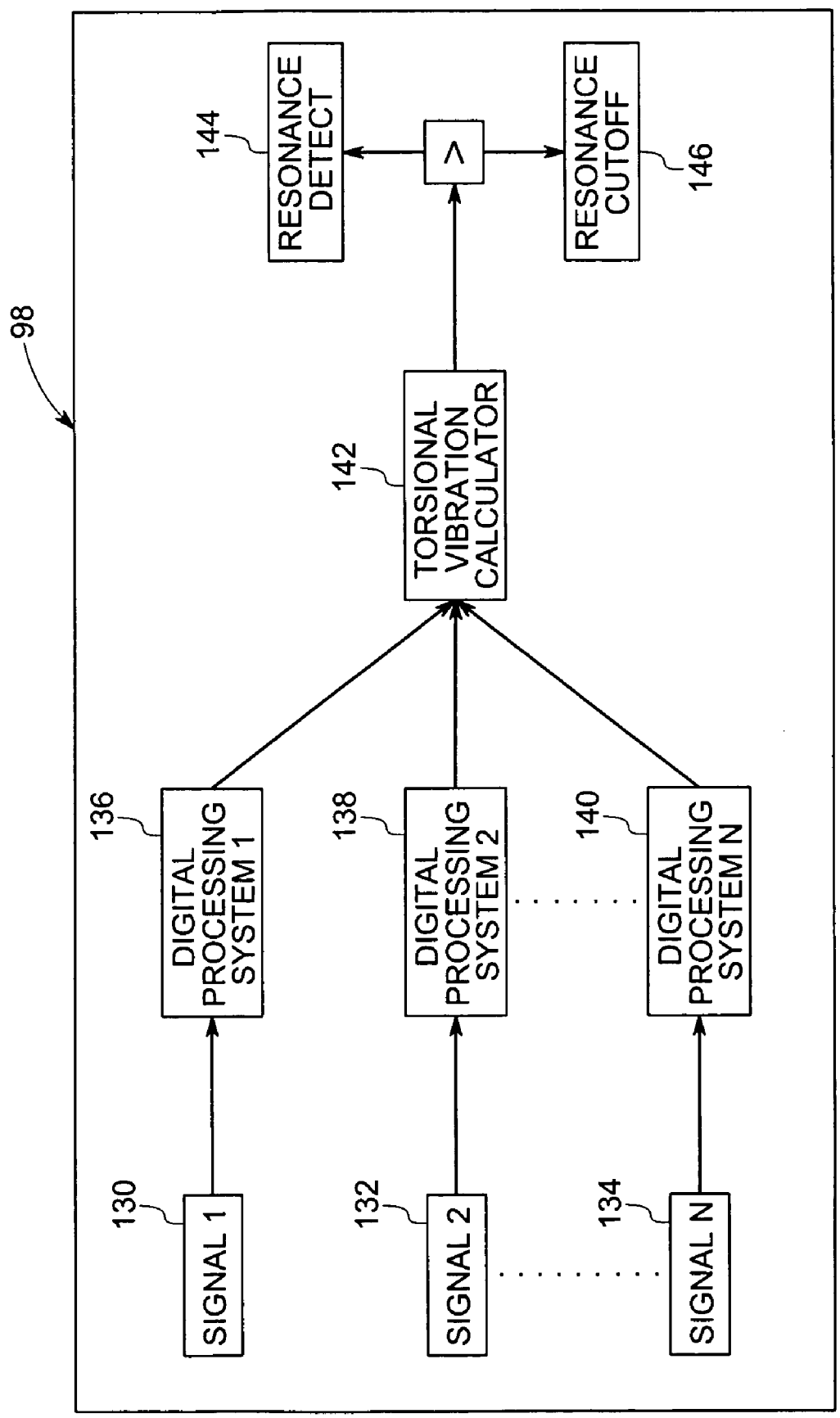
FIG. 7 is a diagrammatical representation of a torsional vibration detector of the adhesion control system of FIG. 4.

FIG. 7 is a diagrammatical representation of the torsional vibration detector 98 of the adhesion control system 84 of FIG. 4. When the locomotive drive train operates in a region that excites the torsional natural frequency of the axle-wheel set, disturbances can be detected in the estimated wheel speeds, difference in the wheel speeds for each axle, wheel tractive efforts, torsional torque, induction motor drive torque estimated as a function of measured terminal voltages and currents for each traction motor and axle-wheel set, motor speed, wheel strain, axle strain, dog-bone strain. Such disturbances have a frequency component that is the same as the torsional natural frequency of the axle-wheel set.

FIG. 7 illustrates a number of signals 130, 132 to 134 representing estimated wheel speeds, difference in wheel speeds for each axle, wheel tractive efforts, torsional torque, estimated motor torque feedback, motor speed, wheel strain, axle strain and dog-bone strain, respectively. These signals are used to determine torsional vibrations in the locomotive drive axle. A bank of systems 136, 138, and 140 digitally process the signals 130, 132 to 134. By way of illustration and not limitation, only three such blocks 136, 138 and 140 are shown. In practice, the number of such blocks is determined by the number of signals processed. Each of the systems 136 to 140 digitally processes its respective input signal to detect the torsional vibration frequency. The outputs of all the blocks are combined into a composite output in the torsional vibration calculator 142. The process of combination may involve calculating partial sums of appropriate combinations of the outputs with each output scaled appropriately and selecting the maximum of these sums. Any particular combination and scalings can be determined analytically and empirically by those skilled in the art without undue experimentation. For example, one such combination involves all of the outputs taken together with unity scale factor, and the composite output is simply the sum of all such outputs. The composite output of 142 is provided to a resonance detector block 144 for comparison with a predetermined torsional vibration level RESONANCE CUTOFF 146. If this level is exceeded, there is an excessive level of torsional vibration present in the drive train, and the output RESONANCE_DETECT of vibration detector is TRUE; otherwise, if the level is not exceeded, the output RESONANCE_DETECT is FALSE. This method for detection of torsional vibration is an enhanced version of the method disclosed in U.S. Pat. No. 6,163,121, discussed above, in which only the estimated motor torque feedback is digitally processed. By processing more signals, detection of torsional vibration can be made more accurate and reliable. A typical embodiment of each digital processing system in FIG. 7 is similar to that disclosed in U.S. Pat. No. 5,841,254 issued on Nov. 24, 1998 to General Electric Company (hereby incorporated into the present disclosure by reference).

In another embodiment of the invention, dynamics of the dog-bone suspension 102 shown in FIG. 5 are additionally accounted for in estimator 96. Physics-based models for these dynamics developed using methods known in the art are appended to the models described in the previous embodiment after appropriate modifications to account for the influence of the dog-bone suspension flexibility on wheel speed dynamics. The function blocks 120 and 122 defined in the estimator 96 of FIG. 6 are accordingly modified. Position sensors, velocity sensors, accelerometers and strain gages can be used to measure the position, velocity, acceleration and forces of the dog-bone bushing, respectively. This may improve accuracy in estimation of the wheel speeds, wheel tractive efforts and torsional torque, and also improve detection of the torsional vibration relative to the previous embodiment using an estimation method similar to that outlined in the previous embodiment. Advantageously, the influence of one axle-wheel set on another axle-wheel set via mechanical coupling can be approximated by means of a disturbance capable of exciting the dog-bone suspension dynamics, thereby indirectly accounting for the influence of inter-axle dynamics.

Figure 8:
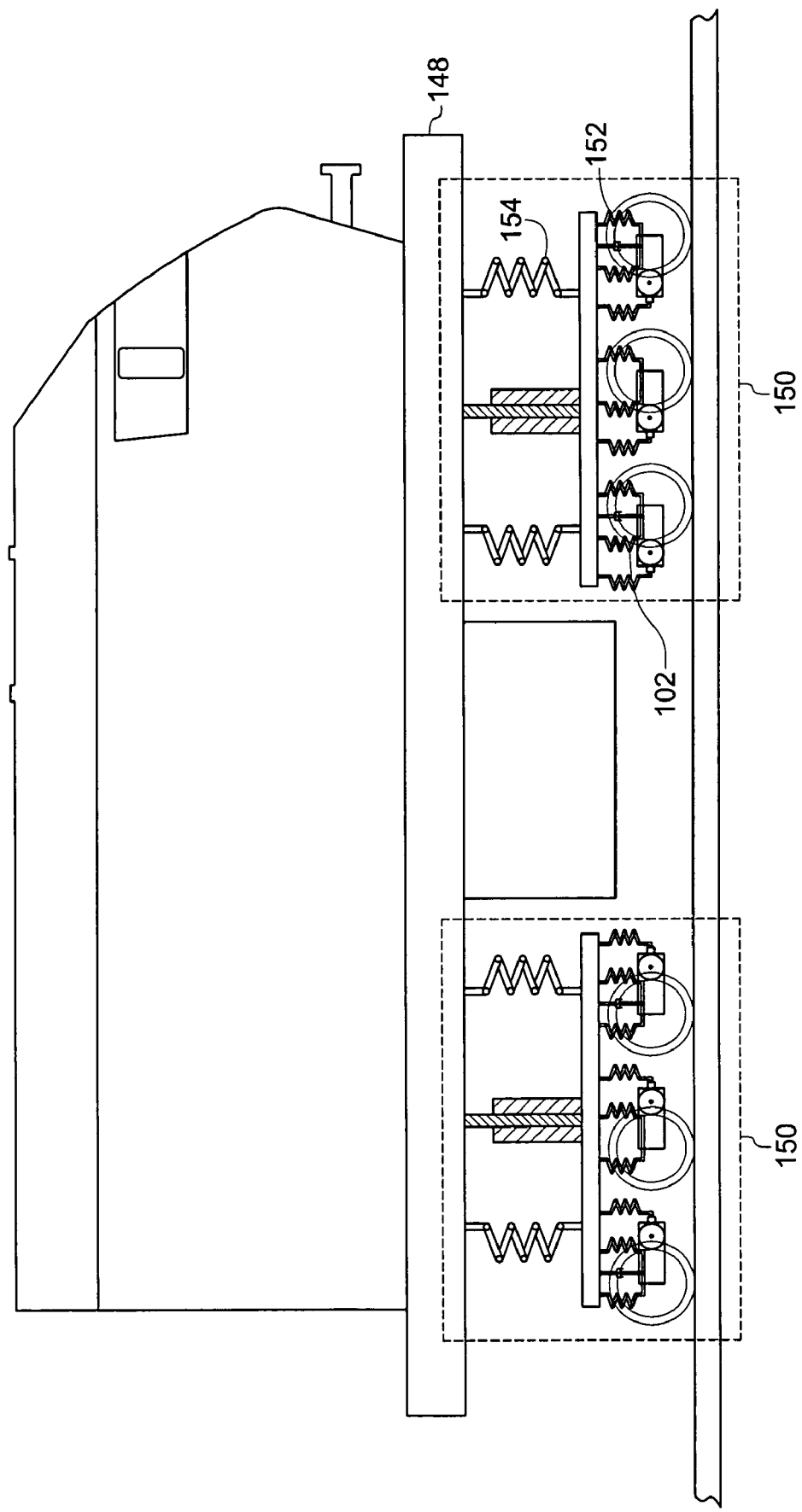
FIG. 8 is a diagrammatical representation of the locomotive of FIG. 1 with an exemplary platform mounted on a pair of exemplary trucks with six exemplary axle-wheel sets.

FIG. 8 shows an exemplary shell of the locomotive 14 mounted on an exemplary platform 148, which in turn is mounted on a pair of exemplary trucks 150, bearing a total of six exemplary axle-wheel sets each powered by a traction motor. Detailed description of each axle-wheel set is given above in relation to FIG. 5. The axle-box suspensions 152 constitute the primary suspensions. Moreover, each truck 150 is connected to the locomotive platform 148 through secondary suspensions 154.

Figure 9:
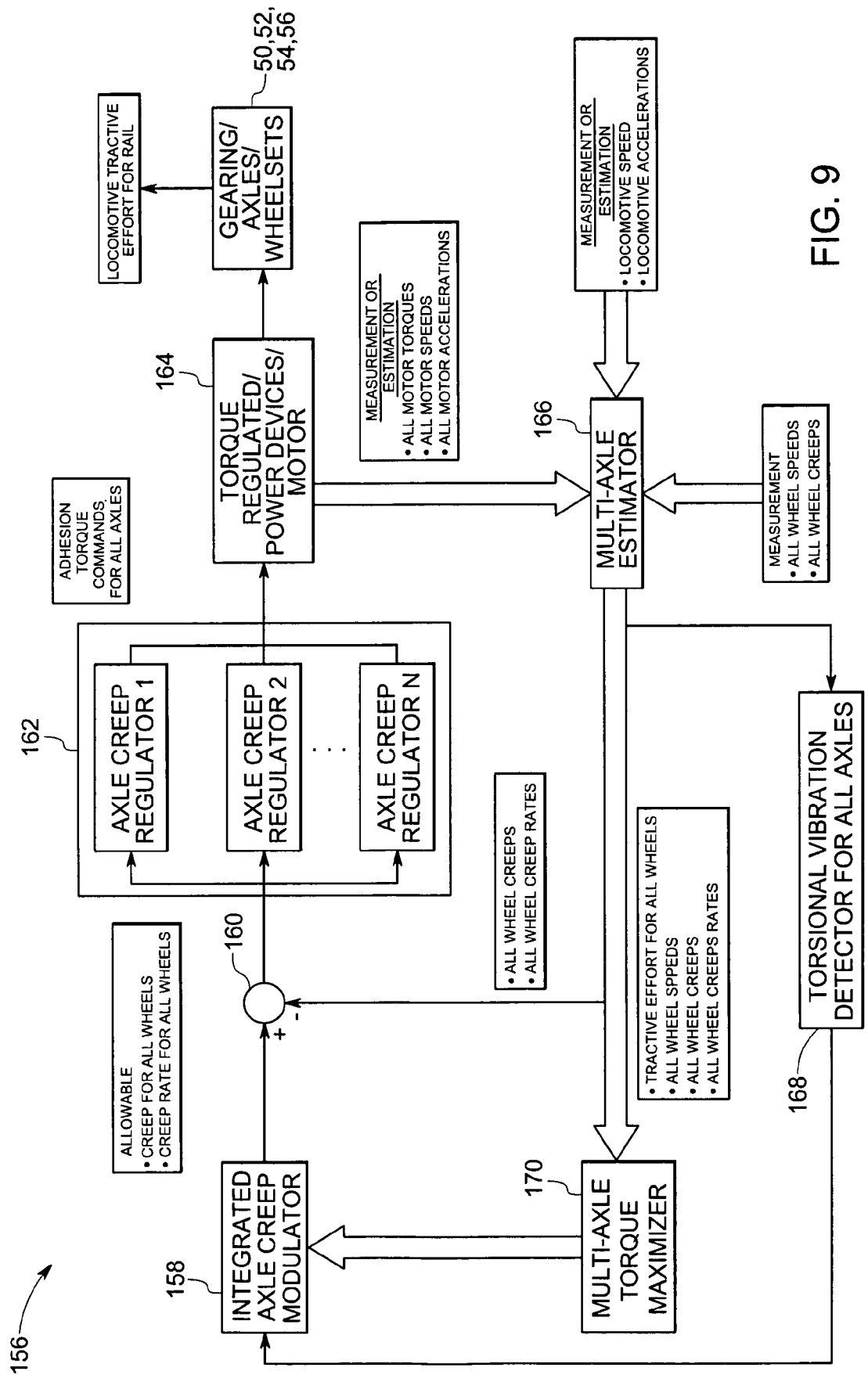
FIG. 9 is a block diagram illustrating one embodiment of an adhesion control system incorporating aspects of the present invention, which involves creep control of all the axle-wheel sets taken together.

An embodiment of the present invention, which explicitly and directly accounts for inter-axle dynamics, is shown in FIG. 9. FIG. 9 is a functional block diagram illustrating one embodiment of an adhesion control system incorporating aspects of the present invention, which involves creep control of all the axle-wheel sets taken together. In particular, this embodiment of the invention involves optimization of traction performance by controlling the allowable creep levels of all the axle-wheel sets taken together and by minimizing torsional vibration per axle. In this embodiment, the wheel speed and the wheel tractive effort estimation/measurement system accounts for the influence of various dynamics of the drive train and also the influence of inter-axle dynamics pertaining to various suspensions and the mechanical coupling between the locomotive platform, all the trucks and all the axle-wheel sets. An illustrative description of such suspensions and mechanical coupling in a typical locomotive is shown earlier in FIG. 8.

Referring to FIG. 9, traction control system 156 comprises a multi-axle torque maximizer 170, an integrated axle creep modulator 158, a multi-axle creep regulator 162, a multi-axle estimator 166 and a torsional vibration detector 168. Torque maximizer 170 measures traction system performance levels and determines the desired torque maximizer state or operating mode for maximizing traction performance of all the axles taken together. The torque maximizer 170 uses the best possible estimates/measurements of actual speeds and tractive efforts of all the locomotive wheels obtained from the estimator 166 to estimate the traction performance level and determine a torque maximizer state.

Estimator 166 explicitly accounts for the influence of inter-axle dynamics owing to various suspensions 102, 152 and 154 of FIG. 8 and the influence of the mechanical coupling between the platform 148, trucks 150 and all the axle-wheel sets shown in FIG. 8. Estimator 166 is an enhancement of the single axle estimator 96 of FIG. 4, based on appropriate physics-based modifications of equations (1)-(5) well known to those skilled in the art. These modifications result in the combined modeling of the individual axles, trucks and platform and the interaction between these elements in FIG. 8. These modifications account for the influence of flexibility of the suspensions 102, 152 and 153 and interaction effects due to the mechanical coupling between the platform 148, trucks 150 and all the axle-wheel sets shown in FIG. 8. In one embodiment of the invention, position sensors, velocity sensors, accelerometers and strain gages can be used to measure the position, velocity, acceleration and forces of the suspension connections.

Referring to FIG. 9, the estimator 166 additionally provides an estimate of the axle torsional torque in all the axles-wheel sets. Advantageously, if direct measurements of any or all the wheel speeds and wheel tractive efforts are available, the estimator 166 can minimize the noise effects in these measurements. The estimator 166 in FIG. 9 is based on an iterative predictor-corrector mechanism similar to that used in estimator 96 illustrated in FIG. 6 for the single axle case, with the predictor based on the model discussed above.

In one embodiment of the invention, the estimator 166 arrives at an estimate of all the wheel tractive effort values based on a direction of the tractive efforts depending on whether the locomotive is motoring or braking. In another embodiment of the invention, the estimator 166 arrives at an estimate of all the wheel tractive effort values based on the individual positions of all the traction motors. Tractive effort maximization systems and methods based on creep rate rather than creep can be readily realized based on an extension of a similar system and method for single axle-wheel set alluded to in the previous embodiment.

The torsional vibration detector 168 shown in FIG. 9 digitally processes all the wheel speed estimates/measurements, differences in wheel speeds for each axle, all wheel tractive effort estimates/measurements, all the axle torsional torque estimates obtained from the estimator 166, in addition to all the motor torque feedback variables, all the motor speeds, wheel strain, axle strain and dog-bone strain for all the axles, in order to detect an unacceptable level of torsional vibration in each axle. Functionally, the torsional vibration detector 168 may be realized as a multiple set of single axle-wheel set torsional vibration detectors, each of which is associated with an axle and is similar in function to the torsional vibration detector 98 illustrated in FIG. 7.

The output of the torque maximizer 170 along with signals representative of the levels of axle torsional vibration modes in all the axles obtained from the torsional vibration detector 168 is provided to the integrated axle creep modulator 158. The function of the creep modulator 158 is to modulate the allowable creep level for all the axles between respective maximum and minimum allowable creep levels. Functionally, the creep modulator 158 may be realized as a multiple set of single axle-wheel set creep modulators, each of which is associated with an axle and is similar in function to the creep modulator 90 in FIG. 4.

The output of the creep modulator 158 comprises multiple set points for wheel creep values of all the axle-wheel sets, which are ideally associated with total peak adhesion. For each axle-wheel set, this creep set point consists of an average value for both the wheels of the axle set or a pair of values for the individual wheels of the axle set.

The actual realized creep for each axle-wheel set is compared with the associated creep set point from 158 at the comparator 160. The error determined by the comparison is input to the creep regulator 162 whose objective is to keep this error as small as possible under all operating conditions through feedback control. The creep regulator is a multi-input, multi-output feedback controller designed to ensure stability of the creep regulation loop for all the axles simultaneously, even when operating in the negative slope region of an adhesion characteristic curve. The creep regulator 162 takes all the creep reference error signals as inputs and its outputs are typically multiple torque commands, one for each axle. The output of the creep regulator 162 is typically a set of multiple torque commands, one for each axle. These torque commands are fed to an array 164 of torque regulator systems, each element of which corresponds to an axle and which typically includes the associated torque regulation circuit, the power devices and the electric motor illustrated in FIG. 2. These motors drive the associated axle-wheel sets of the locomotive through appropriate gearing as shown in 50, 52, 54 and 56.

Advantageously, through the use of the traction control system and method described, traction performance is maximized while torsional vibration levels are minimized even when operating at maximum adhesion levels on each axle. As a further advantage, there is a reduction in operating noise levels due to wheel/rail squeal. An additional advantage of the traction control system illustrated in FIG. 9, is that it may realize more tractive effort or braking effort than the system in FIG. 4 because the system in FIG. 9 accounts for all the axles simultaneously unlike the system in FIG. 4 which separately controls the individual axles without completely accounting for inter-axle effects and hence may not always be optimal.

In general, then, the invention provides for a system in which wheel speed and tractive effort estimates or measurements are used for actual motor control. As described above, several approaches and means may be used for detecting wheel speed (e.g., which may estimated from motor torque and speed, or sensed from wheel speed sensor, or estimated from motor speed or other sensors). The same is true for tractive effort. That is, various approaches and means may be employed, such as deriving such estimates or measurements from torque and the radius of each wheel and mechanical advantage of the drive system for each wheel, or from inverter controls, strain gauges, and so forth.

The invention therefore provided a system and method in which motors for each axle-wheel set may be controlled so as to maintain the optimal creep levels, thereby maximizing the tractive effort or braking effort. As noted, this control may also take into account the performance of other axle-wheel sets. It should also be noted that in systems thus accounting for multiple axle-wheel set drive performance, the motors may not be, and in many cases, will not be driven identically. Differences in the torque commands to each motor may result, for example in different levels of creep or tractive effort for different axle-wheel sets. In this manner, for example, wheels leading a locomotive (whether being driven in "forward" or "reverse") may be caused to slip more than trailing sets, so as to clear or clean tracks for the other sets. Many such drive schemes may be envisaged by those skilled in the art based upon the techniques described above.

Although the invention has been described above, it should be understood that the same is intended by way of illustration and example only and is not to be taken by way of limitation. Accordingly, the spirit and scope of the invention are to be limited only by the terms of the appended claims. Moreover, while only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A traction control system for controlling an electric traction motor drivingly coupled to a wheel of a tractive vehicle, comprising:
    means for determining speed of the wheel;
    means for determining tractive effort of the wheel; and
    control circuitry for controlling drive signals to the motor based upon the wheel speed and tractive effort.

2. The system of claim 1, wherein the means for determining tractive effort includes an estimator coupled to a motor speed sensor and to a motor torque sensor and configured to estimate a tractive effort value or wheel speed value or a torsional vibration value based upon the speed, the torque, or a combination thereof.

3. The system of claim 2, wherein the means for determining torsional vibration includes signals representing wheel speeds or wheel tractive efforts or motor torque or torsional torque or motor speed or wheel strain or axle strain or dog-bone strain, or a combination thereof.

4. The system of claim 1, wherein the vehicle is a locomotive.

5. The system of claim 1, further comprising means for determining torsional vibration of an axle-wheel system in which the wheel is included, and wherein the control circuitry controls the drive signals based also upon the torsional vibration.

6. The system of claim 1, wherein the means for determining the speed of the wheel includes a speed sensor for sensing a speed parameter representative of speed of the wheel.

7. The system of claim 1, wherein the means for determining tractive effort includes a tractive effort sensor for sensing a parameter representative of torque tractive effort of the wheel.

8. The system of claim 7, wherein the tractive effort sensor is a strain sensor.

9. The system of claim 1, wherein the control circuitry is configured to determine current conditions with respect to optimum creep based upon wheel speed and tractive effort, and to control the drive signals based thereon.

10. The system of claim 1, wherein the control circuitry is configured to regulate creep based upon a comparison of estimated or measured wheel speed with estimated or measured vehicle speed.

11. The system of claim 1, wherein the means for determining tractive effort determines tractive effort based at least in part upon a direction of application of the tractive effort.

12. The system of claim 1, wherein the means for determining speed and the means for determining tractive effort account for position of the motor and a suspension system between the motor and the vehicle.

13. A traction control system for controlling an electric traction motor drivingly coupled to an axle-wheel set including two wheels joined by an axle oVa tractive vehicle, comprising:
means for determining speed of each wheel;
means for determining tractive effort of each wheel; and
control circuitry for controlling drive signals to the motor based upon the wheel speeds and tractive efforts;
wherein the means for determining tractive effort includes an estimator coupled to a motor speed sensor and to a motor torque sensor and configured to estimate a tractive effort value or wheel speed value or a torsional vibration value based upon the speed, the torque, or a combination thereof.

14. A traction control system for controlling a plurality of electric traction motors drivingly coupled to wheels of a tractive vehicle, comprising:
means for determining speed of each wheel;
means for determining tractive effort of each wheel; and
control circuitry for controlling drive signals to the motors based upon the wheel speeds and tractive efforts.

15. The system of claim 14, wherein the means for determining tractive effort includes an estimator coupled to motor speed sensors and to motor torque sensors and configured to estimate a tractive effort value or a wheel speed value or a torsional vibration value based upon the speed, the torque, or a combination thereof.

16. The system of claim 15, wherein the control circuitry controls the drive signals to the motors based upon interaction between or among the wheels to maximize overall tractive effort.

17. The system of claim 16, wherein the interaction is between or among multiple trucks.

18. The system of claim 16, wherein the interaction is within a truck.

19. The system of claim 14, wherein the control circuitry applied the control signals to the motors to cause a different level of creep for different wheels or axle-wheel sets.

20. The system of claim 14, wherein the means for determining the speed of the wheels includes speed sensors for sensing a speed parameter representative of speed of each wheel.

21. The system of claim 14, wherein the means for determining tractive effort includes tractive effort sensors for sensing a parameter representative of tractive effort of each wheel.

22. A method for controlling a traction motor of a propulsion system of a tractive vehicle, comprising:
determining speed of the wheel;
determining tractive effort of the wheel; and
applying drive signals to the motor based upon the wheel speed and tractive effort.

23. The method of claim 22, further comprising determining torsional vibration of an axle-wheel system in which the wheel is included, and wherein the drive signals are applied based also upon the torsional vibration.

24. The method of claim 22, wherein the speed of the wheel is determined based upon a sensed signal from a speed sensor that senses a parameter representative of speed of the wheel.

25. The method of claim 22, wherein the tractive effort is determined based upon a sensed signal from a tractive effort sensor that senses a parameter representative of tractive effort of the wheel.

26. The method of claim 22, wherein the tractive effort is determined by an estimator coupled to a motor speed sensor and to a motor torque sensor and configured to estimate a tractive effort value or a creep value or a wheel speed value based upon the speed, the torque, or a combination thereof.

27. A method for controlling a plurality of electric traction motors drivingly coupled to wheels of a tractive vehicle, comprising:
determining speed of each wheel;
determining tractive effort of each wheel; and
applying drive signals to each motor based upon the wheel speed and tractive effort.

28. The system of claim 27, wherein the control signals applied to the motors cause a different level of creep for different wheels or axle-wheel sets.

29. A traction control system for controlling an electric traction motor drivingly coupled to a wheel of a tractive vehicle, comprising:
a machine readable medium; and
code stored on the machine readable medium including instructions for determining speed of the wheel, for determining tractive effort of the wheel, and for controlling drive signals to the motor based upon the wheel speed and tractive effort.

30. A traction control system for controlling a plurality of electric traction motors drivingly coupled to wheels of a tractive vehicle, comprising:
a machine readable medium; and
code stored on the machine readable medium including instructions for determining speed of each wheel, for determining tractive effort of each wheel, and for controlling drive signals to the motors based upon the wheel speeds and tractive efforts.

* * * * *